(12) United States Patent
Komatsu (10) Patent No.: US 11,761,400 B2
(45) Date of Patent: Sep. 19, 2023

(54) ENGINE DEVICE

(71) Applicant: TOYOTA JIDOSHA KABUSHIKI KAISHA, Aichi-ken (JP)

(72) Inventor: Takehiro Komatsu, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/965,764

(22) Filed: Oct. 14, 2022

(65) Prior Publication Data

US 2023/0220812 A1 Jul. 13, 2023

(30) Foreign Application Priority Data

Jan. 12, 2022 (JP) .................................. 2022-003146

(51) Int. Cl.
*F02D 41/40* (2006.01)
*F02D 41/06* (2006.01)

(52) U.S. Cl.
CPC ......... *F02D 41/401* (2013.01); *F02D 41/062* (2013.01); *F02D 2200/0406* (2013.01)

(58) Field of Classification Search
CPC ................ F02D 41/401; F02D 41/062; F02D 2200/0406
See application file for complete search history.

(56) References Cited

U.S. PATENT DOCUMENTS

| | | | | |
|---|---|---|---|---|
| 5,513,616 A * | 5/1996 | Matsumoto | ............ | F02M 26/49 73/114.74 |
| 6,234,141 B1 * | 5/2001 | Kerns | ................... | F02D 41/062 123/305 |
| 2004/0200448 A1 | 10/2004 | Kojima et al. | | |
| 2006/0021602 A1 * | 2/2006 | Liller | ................. | B60K 6/48 123/491 |
| 2010/0114462 A1 * | 5/2010 | Gibson | ................ | F02D 41/042 123/339.14 |
| 2012/0271537 A1 * | 10/2012 | Okabe | .................. | F02N 99/006 701/112 |
| 2013/0173103 A1 * | 7/2013 | Ando | ..................... | F02D 41/22 180/65.265 |
| 2013/0276756 A1 * | 10/2013 | Leone | ................... | H04N 19/46 123/445 |
| 2013/0297187 A1 * | 11/2013 | Doering | ............... | B60W 10/02 701/104 |

(Continued)

FOREIGN PATENT DOCUMENTS

| JP | 2004316455 A | 11/2004 |
|---|---|---|
| JP | 201395155 A | 5/2013 |
| JP | 201395157 A | 5/2013 |

*Primary Examiner* — Carl C Staubach
(74) *Attorney, Agent, or Firm* — HAUPTMAN HAM, LLP (57) ABSTRACT

A fuel injection timing is made later and/or a fuel injection amount is made larger in a target cylinder to be subjected to explosive combustion subsequently, when a required rotation time that is a time required for rotation of an output shaft by a predetermined rotational angle is equal to or longer than a time threshold than when the required rotation time is shorter than the time threshold, at the time of predetermined startup control in which an engine and a clutch are controlled such that fuel injection and ignition in the engine are resumed from a state where the supply of fuel to the engine is cut off and the clutch is released and that the clutch is then engaged.

5 Claims, 3 Drawing Sheets

(56) References Cited

U.S. PATENT DOCUMENTS

| | | | |
|---|---|---|---|
| 2015/0066338 A1* | 3/2015 | Howell | F02D 41/042 701/112 |
| 2015/0247482 A1* | 9/2015 | Enomoto | F02N 11/0814 701/113 |
| 2015/0252771 A1* | 9/2015 | Shoda | F02D 29/02 123/445 |
| 2018/0298840 A1* | 10/2018 | Hagiwara | F02B 43/04 |
| 2021/0003107 A1* | 1/2021 | Byun | B60K 6/48 |

* cited by examiner

ENGINE DEVICE

CROSS-REFERENCE TO RELATED APPLICATION

This application claims priority to Japanese Patent Application No. 2022-003146 filed on Jan. 12, 2022, incorporated herein by reference in its entirety.

BACKGROUND

1. Technical Field

The disclosure relates to an engine device, and more specifically, to an engine device that is equipped with an engine and a motor connected to an output shaft of the engine via a clutch.

2. Description of Related Art

Conventionally, as this kind of engine device, there is proposed an engine device with which a hybrid electric vehicle that is equipped with an engine, a motor connected to an output shaft of the engine via a clutch, and a transmission connected to a rotary shaft of the motor and an axle is mounted (e.g., see Japanese Unexamined Patent Application Publication No. 2013-095157 (JP 2013-095157 A)). In this engine device, with the output shaft of the engine stopped from rotating, fuel injection and ignition are carried out to rotate the output shaft. After that, the motive power from the motor side via the clutch provides assistance in rotating the output shaft to start up the engine.

SUMMARY

With this engine device, in the case where fuel injection and ignition in the engine are resumed from a state where the supply of fuel to the engine is cut off and the clutch is released and then the clutch is engaged, there is an apprehension about the occurrence of pre-ignition in the engine, for example, when the pressure in an intake manifold is made relatively high to output a torque from the engine.

It is a main object of an engine device of the disclosure to suppress the occurrence of pre-ignition in an engine.

The engine device of the disclosure has adopted the following means to achieve the foregoing main object.

The engine device of the disclosure is an engine device that is equipped with an engine having an in-cylinder injection valve, a motor connected to an output shaft of the engine via a clutch, and a control device that controls the engine, the motor, and the clutch. The control device at least either makes a fuel injection timing later or makes a fuel injection amount larger in a target cylinder to be subjected to explosive combustion subsequently, when a required rotation time that is a time required for rotation of the output shaft by a predetermined rotational angle is equal to or longer than a time threshold than when the required rotation time is shorter than the time threshold, at the time of predetermined startup control in which the engine and the clutch are controlled such that fuel injection and ignition in the engine are resumed from a state where the supply of fuel to the engine is cut off and the clutch is released and that the clutch is then engaged.

In the engine device of the disclosure, the fuel injection timing is made later and/or the fuel injection amount is made larger in the target cylinder to be subjected to explosive combustion subsequently, when the required rotation time that is the time required for rotation of the output shaft by the predetermined rotational angle is equal to or longer than the time threshold than when the required rotation time is shorter than the time threshold, at the time of predetermined startup control in which the engine and the clutch are controlled such that fuel injection and ignition in the engine are resumed from the state where the supply of fuel to the engine is cut off and the clutch is released and that the clutch is then engaged. When the fuel injection timing is retarded or the fuel injection amount is increased, the amount of latent heat of vaporization of fuel injected from the fuel injection valve increases, and the temperature in a combustion chamber can be restrained from rising. Therefore, the occurrence of pre-ignition can be suppressed. It should be noted herein that "the predetermined rotational angle" can be set equal to, for example, 30°.

In the engine device of the disclosure, the time threshold may be set in such a manner as to shorten as a closure intake manifold pressure that is a pressure in an intake manifold upon the closure of an intake valve for the target cylinder rises. This is for the purpose of retarding the fuel injection timing or increasing the fuel injection amount in view of the fact that the likelihood of the occurrence of pre-ignition increases as the closure intake manifold pressure rises.

In the engine device of the disclosure, a condition for engaging the clutch may include a condition that a differential rotational speed between a rotational speed of the motor and a rotational speed of the engine is lower than a predetermined rotational speed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the disclosure will be described through the use of the embodiments.

Figure 1:
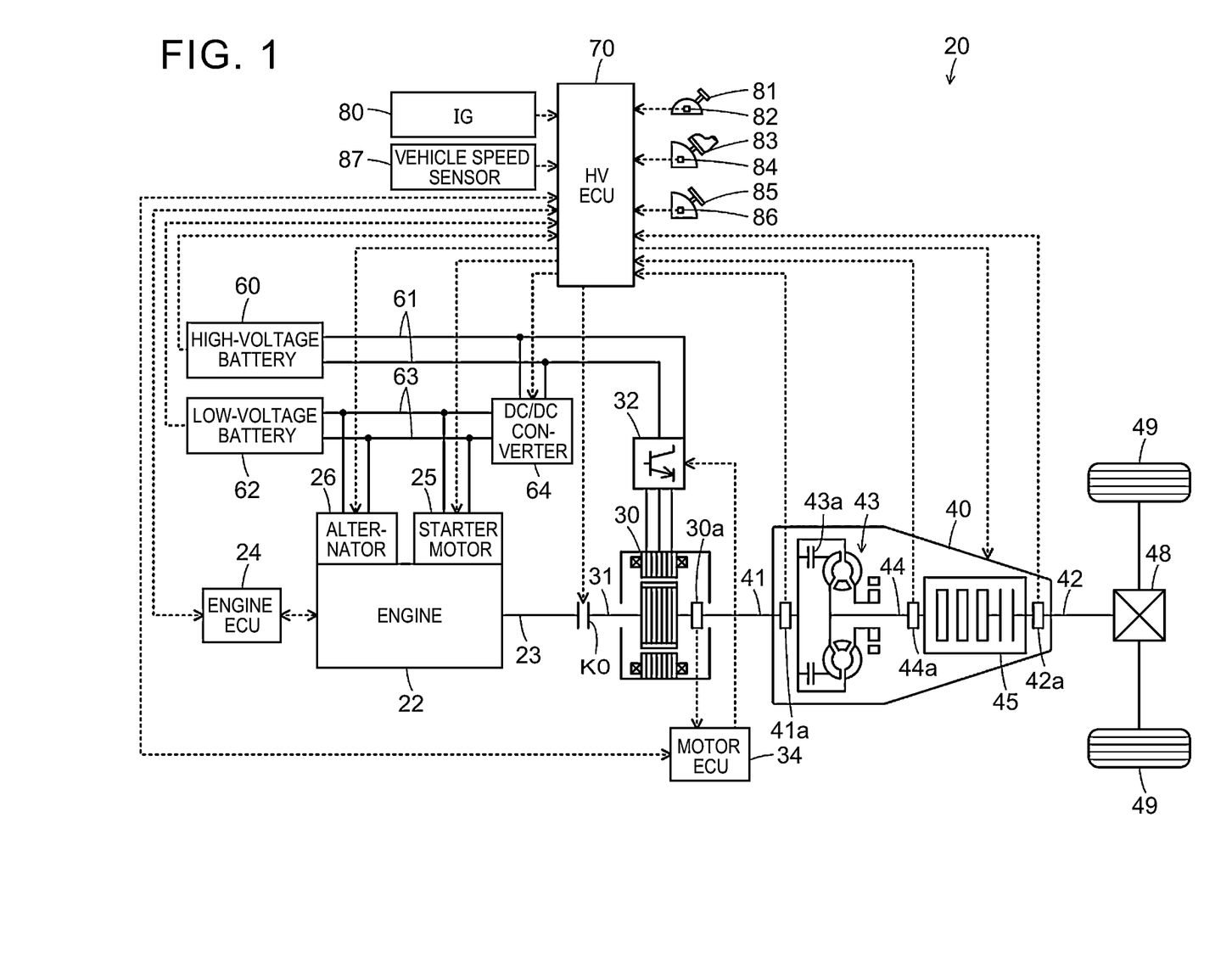
FIG. 1 is a block diagram showing the outline of the configuration of a hybrid electric vehicle 20 that is mounted with an engine device as one of the embodiments of the disclosure.
Figure 2:
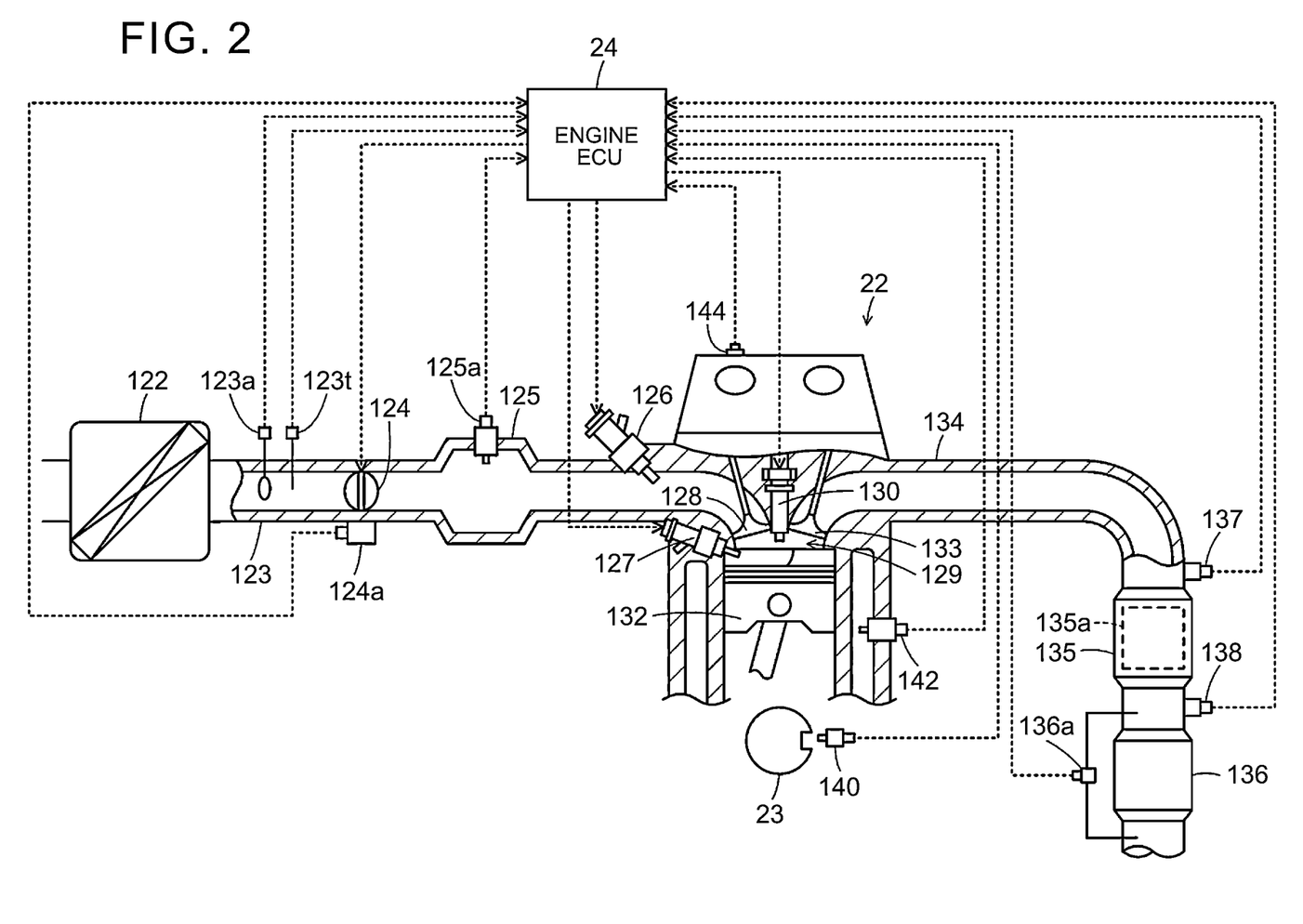
FIG. 2 is a block diagram showing the outline of the configuration of an engine 22 with which the hybrid electric vehicle 20 is mounted.

FIG. 1 is a block diagram showing the outline of the configuration of a hybrid electric vehicle 20 that is mounted with an engine device as one of the embodiments of the disclosure. FIG. 2 is a block diagram showing the outline of the configuration of an engine 22 with which the hybrid electric vehicle 20 is mounted. As shown in FIG. 1, the hybrid electric vehicle 20 of the embodiment is equipped with the engine 22, a motor 30, an inverter 32, a clutch K0, an automatic transmission device 40, a high-voltage battery 60, a low-voltage battery 62, a DC/DC converter 64, and a hybrid electronic control unit (hereinafter referred to as "an HVECU") 70.

The engine 22 is configured as a six-cylinder internal combustion engine that outputs motive power through four strokes, namely, suction, compression, expansion (explosive combustion), and exhaust using a fuel, for example, gasoline or light oil. As shown in FIG. 2, the engine 22 has a port injection valve 126 that injects fuel into an intake port, and an in-cylinder injection valve 127 that injects fuel into a cylinder. The engine 22 has the port injection valve 126 and the in-cylinder injection valve 127, and can thereby be operated in one of a port injection mode, an in-cylinder injection mode, and a shared injection mode. In the port injection mode, the air cleaned by an air cleaner 122 is sucked into an intake pipe 123 and is made to pass through a throttle valve 124 and a surge tank 125, and fuel is injected from the port injection valve 126 located downstream of the surge tank 125 in the intake pipe 123 to mix air with fuel. This air-fuel mixture is then sucked into a combustion chamber 129 via an intake valve 128, and is burned in an explosive manner through electric sparks generated by an ignition plug 130, and reciprocating motion of a piston 132 that is depressed by the energy of explosive combustion in a cylinder bore is converted into rotational motion of a crankshaft 23. In the in-cylinder injection mode, air is sucked into the combustion chamber 129 in the same manner as in the port injection mode, fuel is injected from the in-cylinder injection valve 127 in a suction stroke and a compression stroke, and the air-fuel mixture is burned in an explosive manner through electric sparks generated by the ignition plug 130 to obtain rotational motion of the crankshaft 23. In the shared injection mode, when air is sucked into the combustion chamber 129, fuel is injected from the port injection valve 126, fuel is injected from the in-cylinder injection valve 127 in a suction stroke and a compression stroke, and the air-fuel mixture is burned in an explosive manner through electric sparks generated by the ignition plug 130 to obtain rotational motion of the crankshaft 23. A changeover is made among these injection modes, based on the operating state of the engine 22. The exhaust gas that is discharged from the combustion chamber 129 to an exhaust pipe 134 via an exhaust valve 133 is discharged to outside air via an emission control device 135 and a PM filter 136. The emission control device 135 has an emission control catalyst (a three-way catalyst) 135a that removes noxious components such as carbon monoxide (CO), hydrocarbons (HC), and nitrogen oxides (NOx) from exhaust gas. The PM filter 136 is formed as a porous filter made of ceramics, stainless, or the like, and collects particulate matter (PM) such as soot in exhaust gas. Incidentally, a four-way catalyst obtained by combining the emission control function of the three-way catalyst with the function of collecting particulate matter may be used instead of the PM filter 136.

The operation of the engine 22 is controlled by the engine ECU 24. Although not shown in the drawing, the engine ECU 24 is equipped with a microcomputer having a CPU, a ROM, a RAM, a flash memory, input/output ports, and a communication port. Signals from various sensors that are needed to control the operation of the engine 22 are input to the engine ECU 24 via the input ports respectively. As the signals input to the engine ECU 24, it is possible to mention, for example, a crank angle $\theta cr$ from a crank position sensor 140 that detects a rotational position of the crankshaft 23 of the engine 22, and a coolant temperature Tw from a coolant temperature sensor 142 that detects a temperature of coolant in the engine 22. It is also possible to mention cam angles $\theta ci$ and $\theta co$ from a cam position sensor 144 that detects a rotational position of an intake camshaft that opens/closes the intake valve 128 and a rotational position of an exhaust camshaft that opens/closes the exhaust valve 133. It is also possible to mention a throttle opening degree TH from a throttle valve position sensor 124a that detects a position of the throttle valve 124, an intake air amount Qa from an airflow meter 123a attached to the intake pipe 123 upstream of the throttle valve 124, an intake air temperature Ta from a temperature sensor 123t attached to the intake pipe 123 upstream of the throttle valve 124, and a surge pressure Ps from a pressure sensor 125a attached to the surge tank 125. It is also possible to mention a front air-fuel ratio AF1 from a front air-fuel ratio sensor 137 attached to the exhaust pipe 134 upstream of the emission control device 135, a rear air-fuel ratio AF2 from a rear air-fuel ratio sensor 138 attached to the exhaust pipe 134 between the emission control device 135 and the PM filter 136, and a differential pressure $\Delta P$ from a differential pressure sensor 136a that detects a differential pressure across the PM filter 136 (a difference in pressure between the upstream and downstream sides of the PM filter 136).

Various control signals for controlling the operation of the engine 22 are output from the engine ECU 24 via the output ports respectively. As the signals that are output from the engine ECU 24, it is possible to mention, for example, a control signal to the throttle valve 124, a control signal to the port injection valve 126, a control signal to the in-cylinder injection valve 127, and a control signal to the ignition plug 130.

The engine ECU 24 is connected to the HVECU 70 via the communication port. The engine ECU 24 computes a rotational speed Ne of the engine 22 based on the crank angle $\theta cr$ of the engine 22 from the crank position sensor 140, and computes a 30° rotation required time T30 that is a time required for rotation of the crankshaft 23 by the crank angle $\theta ca$ equal to 30°. Besides, the engine ECU 24 computes a load factor (a ratio of a volume of air actually sucked on one cycle to a cylinder capacity of the engine 22 per cycle) KL based on the intake air amount Qa from the airflow meter 123a and the rotational speed Ne of the engine 22. Furthermore, the engine ECU 24 computes a PM deposition amount Qpm as a deposition amount of particulate matter deposited in the PM filter 136 based on the differential pressure $\Delta P$ from the differential pressure sensor 136a, and computes a filter temperature tf as a temperature of the PM filter 136 based on the rotational speed Ne and the load factor KL of the engine 22.

As shown in FIG. 1, a starter motor 25 for cranking the engine 22, and an alternator 26 that generates electric power through the use of motive power from the engine 22 are connected to the crankshaft 23 of the engine 22. The starter motor 25 and the alternator 26 are connected, together with the low-voltage battery 62, to a low voltage-side electric power line 63, and is controlled by the HVECU 70.

The motor 30 is configured as a synchronous generator motor, and has a rotor with a rotor core in which a permanent magnet is embedded, and a stator with a stator core around which a three-phase coil is wound. A rotary shaft 31 to which the rotor of the motor 30 is fixed is connected to the crankshaft 23 of the engine 22 via the clutch K0, and is connected to an input shaft 41 of an automatic transmission 45. The inverter 32 is used to drive the motor 30, and is connected to a high voltage-side electric power line 61. A plurality of switching elements of the inverter 32 is subjected to switching control by a motor electronic control unit (hereinafter referred to as "a motor ECU") 34, and the motor 30 is thereby driven rotationally.

Although not shown in the drawing, the motor ECU 34 is equipped with a microcomputer having a CPU, a ROM, a RAM, a flash memory, input/output ports, and a communication port. Signals from various sensors are input to the motor ECU 34 via the input ports respectively. As the signals that are input to the motor ECU 34, it is possible to mention, for example, a rotational position θmg from a rotational position sensor 30a that detects a rotational position of the rotor (the rotary shaft 31) of the motor 30, and phase currents Iu and Iv from current sensors that detect phase currents of the phases of the motor 30 respectively. A control signal to the inverter 32 and the like are output from the motor ECU 34 via the output ports respectively. The motor ECU 34 is connected to the HVECU 70 via the communication port. The motor ECU 34 computes a rotational speed Nmg of the motor 30 based on a rotational position θmg of the rotor (the rotary shaft 31) of the motor 30 from the rotational position sensor 30a.

The clutch K0 is configured as, for example, a hydraulically driven friction clutch, and is controlled by the HVECU 70 to connect the crankshaft 23 of the engine 22 and the rotary shaft 31 of the motor 30 to each other and disconnect the crankshaft 23 of the engine 22 and the rotary shaft 31 of the motor 30 from each other.

The automatic transmission device 40 has a torque converter 43 and the automatic transmission 45 with, for example, six speeds. The torque converter 43 is configured as a general hydraulic power transmission, and transmits the motive power of the input shaft 41 connected to the rotary shaft 31 of the motor 30 to a transmission input shaft 44 that is an input shaft of the automatic transmission 45 either with a torque amplified or directly with no torque amplified. The automatic transmission 45 has the transmission input shaft 44, an output shaft 42 coupled to driving wheels 49 via a differential gear 48, a plurality of planetary gears, and a plurality of hydraulically driven frictional engagement elements (clutches and brakes). Each of the frictional engagement elements has a piston, a plurality of frictional engagement plates (at least one friction plate and at least one separator plate), and a hydraulic servo configured by, for example, an oil chamber to which hydraulic oil is supplied. The automatic transmission 45 forms forward speeds from a first speed to a sixth speed and a backward speed through engagement and release of the frictional engagement elements, and transmits motive power between the transmission input shaft 44 and the output shaft 42. The hydraulic oil from a mechanical oil pump or an electric oil pump is adjusted in pressure and supplied to the clutch K0 and the automatic transmission 45 by an oil pressure control device (not shown). The oil pressure control device has a valve body in which a plurality of oil passages is formed, a plurality of regulator valves, a plurality of linear solenoid valves, and the like. The oil pressure control device is controlled by the HVECU 70.

The high-voltage battery 60 is configured as, for example, a lithium-ion secondary battery or nickel hydride secondary battery with a rated voltage of about several hundred V, and is connected, together with the inverter 32, to the high voltage-side electric power line 61. The low-voltage battery 62 is configured as, for example, a lead storage battery with a rated voltage of about 12 V or 14 V, and is connected, together with the starter motor 25 and the alternator 26, to the low voltage-side electric power line 63. The DC/DC converter 64 is connected to the high voltage-side electric power line 61 and the low voltage-side electric power line 63. The DC/DC converter 64 supplies the electric power of the high voltage-side electric power line 61 to the low voltage-side electric power line 63 with the voltage stepped down.

Although not shown in the drawing, the HVECU 70 is equipped with a microcomputer having a CPU, a ROM, a RAM, a flash memory, input/output ports, and communication ports. Signals from various sensors are input to the HVECU 70 via the input ports respectively. As the signals that are input to the HVECU 70, it is possible to mention, for example, a rotational speed Nin from a rotational speed sensor 41a attached to the input shaft 41 of the automatic transmission device 40, a rotational speed Nmi from a rotational speed sensor 44a attached to the transmission input shaft 44 of the automatic transmission device 40, and a rotational speed Nout from a rotational speed sensor 42a attached to the output shaft 42 of the automatic transmission device 40. It is also possible to mention a voltage Vbh of the high-voltage battery 60 from a voltage sensor attached between terminals of the high-voltage battery 60, a current Ibh of the high-voltage battery 60 from a current sensor attached to the output terminal of the high-voltage battery 60, and a voltage Vbl from a voltage sensor attached between terminals of the low-voltage battery 62. It is also possible to mention an ignition signal from the ignition switch 80, a shift position SP from a shift position sensor 82 that detects an operation position of a shift lever 81, an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 87.

Various control signals are output from the HVECU 70 via the output ports respectively. As the signals that are output from the HVECU 70, it is possible to mention, for example, a control signal to the starter motor 25 and a control signal to the alternator 26. It is also possible to mention control signals to the clutch K0 and the automatic transmission device 40 (the oil pressure control device), and a control signal to the DC/DC converter 64.

The HVECU 70 is connected to the engine ECU 24 and the motor ECU 34 via the communication ports respectively. The HVECU 70 computes a rotational speed ratio Gt of the automatic transmission device 40 by dividing the rotational speed Nin of the input shaft 41 of the automatic transmission device 40 from the rotational speed sensor 41a by the rotational speed Nout of the output shaft 42 of the automatic transmission device 40 from the rotational speed sensor 42a.

Incidentally, in the embodiment, the engine 22, the clutch K0, the motor 30, the HVECU 70, the engine ECU 24, and the motor ECU 34 correspond to the engine device.

In the hybrid electric vehicle 20 of the embodiment configured in this manner, the engine 22, the clutch K0, the motor 30, and the automatic transmission device 40 are controlled such that the hybrid electric vehicle 20 runs in a hybrid running mode (an HV running mode) or an electric running mode (an EV running mode) through cooperative control of the HVECU 70, the engine ECU 24, and the motor ECU 34. It should be noted herein that the HV running mode is a mode in which the hybrid electric vehicle 20 runs through the use of the motive power of the engine 22 with the clutch K0 engaged, and that the EV running mode is a mode in which the hybrid electric vehicle 20 runs without the use of the motive power of the engine 22 with the clutch K0 released.

In the control of the automatic transmission device 40 in the HV running mode or the EV running mode, the HVECU 70 first sets a target shift speed M* of the automatic transmission 45 based on the accelerator depression amount Acc and the vehicle speed V. Then, when a shift speed M of the automatic transmission 45 coincides with the target shift speed M*, the automatic transmission 45 is controlled such that the shift speed M is maintained. On the other hand, when the shift speed M is different from the target shift speed M*, the automatic transmission 45 is controlled such that the shift speed M coincides with the target shift speed M*.

In the control of the engine 22 and the motor 30 in the HV running mode, the HVECU 70 first sets a required torque Tout* that is required of running (that is required of the output shaft 42 of the automatic transmission device 40) based on the accelerator depression amount Acc and the vehicle speed V. Subsequently, the HVECU 70 sets a value obtained by dividing the required torque Tout* of the output shaft 42 by the rotational speed ratio Gt of the automatic transmission device 40, as a required torque Tin* of the input shaft 41. Upon setting the required torque Tin* of the input shaft 41, the HVECU 70 sets the target torque Te* of the engine 22 and the torque command Tm* of the motor 30 such that the required torque Tin* is output to the input shaft 41, transmits the target torque Te* of the engine 22 to the engine ECU 24, and transmits the torque command Tm* of the motor 30 to the motor ECU 34. Upon receiving the target torque Te*, the engine ECU 24 performs operation control (intake air amount control, fuel injection control, ignition control, and the like) of the engine 22 such that the engine 22 is operated with the target torque Te*. Upon receiving the torque command Tm*, the motor ECU 34 performs switching control of the switching elements of the inverter 32 such that the motor 30 is driven with the torque command Tm*.

In controlling the motor 30 in the EV running mode, the HVECU 70 sets the required torque Tin* of the input shaft 41 in the same manner as in the HV running mode, sets the torque command Tm* of the motor 30 such that the required torque Tin* is output to the input shaft 41, and transmits the torque command Tm* to the motor ECU 34. Upon receiving the torque command Tm*, the motor ECU 34 performs switching control of the switching elements of the inverter 32 such that the motor 30 is driven with the torque command Tm*.

Besides, in the hybrid electric vehicle 20 of the embodiment, the torque from the engine 22 is replaced with the torque from the motor 30 upon fulfillment of a stop condition in the HV running mode, the supply of fuel to the engine 22 is then cut off, and the clutch K0 is released when the rotational speed Ne of the engine 22 is lower than a threshold Neref1 (e.g., about 600 rpm to 800 rpm), through cooperative control of the HVECU 70, the engine ECU 24, and the motor ECU 34. Then, upon fulfillment of a startup condition during rotation of the engine 22, startup control of the engine 22 is performed with a recovery from the cutoff of supply of fuel to the engine 22 (the resumption of fuel injection and ignition). As the stop condition, it is possible to use, for example, a condition that the required torque Tin* of the input shaft 41 is smaller than a threshold Tinref during operation of the engine 22. As the startup condition, it is possible to use, for example, a condition that the required torque Tin* is equal to or larger than the threshold Tinref during intermittent stop of the engine 22. As startup control of the engine 22, it is possible to mention, for example, fuel cut (FC) recovery control, self-supporting change-of-mind (COM) startup control, and COM startup control.

FC recovery control is basically performed when the rotational speed Ne of the engine 22 is equal to or higher than the threshold Neref11 upon fulfillment of the startup condition. In FC recovery control, fuel injection and ignition in the engine 22 are resumed while keeping the clutch K0 engaged.

Self-supporting COM startup control is basically performed when the rotational speed Ne of the engine 22 is lower than the threshold Neref1 and equal to or higher than a threshold Neref2 that is lower than the threshold Neref1 (e.g., by about several hundred rpm). In self-supporting COM startup control, fuel injection and ignition in the engine 22 are resumed while keeping the clutch K0 released, the engine 22 is controlled such that a differential rotational speed ΔN between the rotational speed Nmg of the motor 30 and the rotational speed Ne of the engine 22 decreases, and the clutch K0 is engaged upon fulfillment of a condition for engaging the clutch K0.

COM startup control is basically performed when the rotational speed Ne of the engine 22 is lower than the threshold Neref2 upon fulfillment of the startup condition. In COM startup control, the clutch K0 is half-engaged (slip-engaged), fuel injection and ignition are resumed while cranking the engine 22 through the use of a cranking torque from the motor 30, the clutch K0 is released while controlling the engine 22 such that the differential rotational speed ΔN decreases, and the clutch K0 is engaged upon fulfillment of the condition for engaging the clutch K0.

As the condition for engaging the clutch K0 at the time of self-supporting COM startup control and COM startup control, it is possible to use, for example, a condition that the differential rotational speed ΔN is lower than a threshold ΔNref (e.g., about 50 rpm to 150 rpm). Besides, fuel injection control at the time of FC recovery control, self-supporting COM startup control, and COM startup control is performed in the in-cylinder injection mode.

Figure 3:
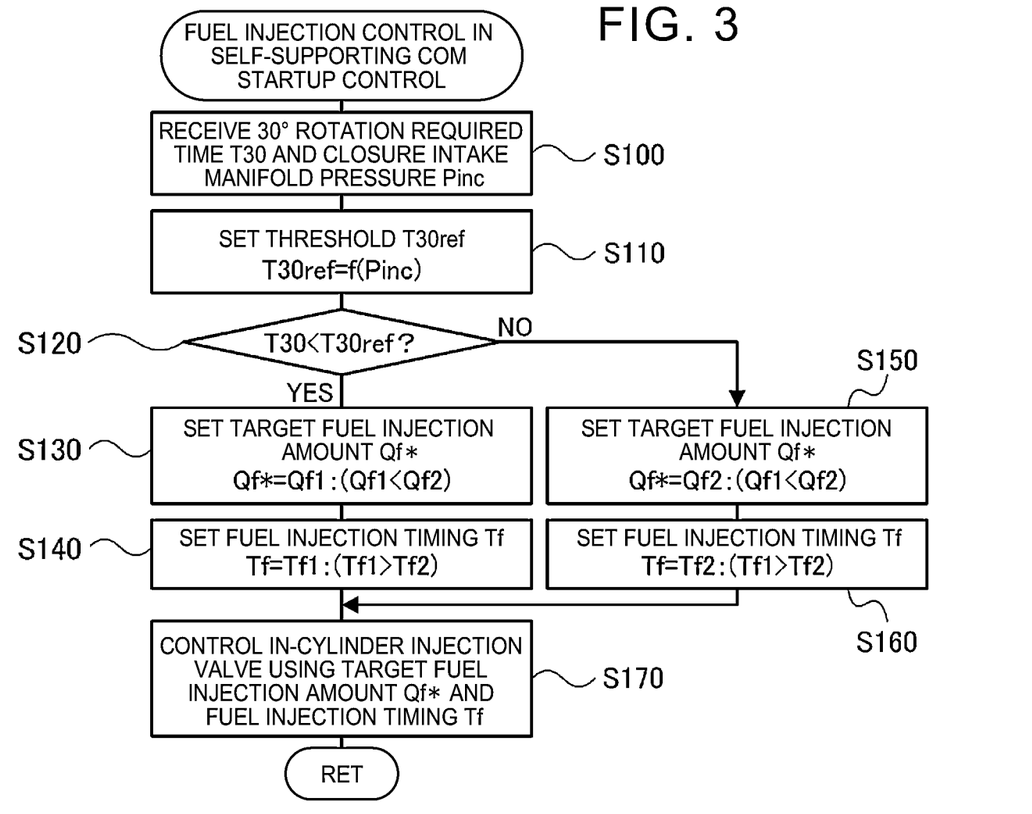
FIG. 3 is a flowchart showing an example of fuel injection control at the time of self-supporting COM startup control that is performed by an engine ECU 24.

Next, the behavior of the hybrid electric vehicle 20 of the embodiment, especially fuel injection control of the engine 22 at the time of self-supporting COM startup control will be described. FIG. 3 is a flowchart showing an example of fuel injection control at the time of self-supporting COM startup control that is performed by the engine ECU 24. This routine is repeatedly executed while changing over a target cylinder to be subjected to explosive combustion subsequently, at the time of self-supporting COM startup control. Incidentally, at the time of self-supporting COM startup control, fuel injection and ignition in the engine 22 are resumed while keeping the clutch K0 released, so the differential rotational speed ΔN between the rotational speed Nmg of the motor 30 and the rotational speed Ne of the engine 22 needs to be decreased by the torque from the engine 22. Therefore, as for intake air amount control and ignition control at the time of self-supporting COM startup control, the control of the throttle valve 124 and the control of the ignition plug 130 are basically performed such that the differential rotational speed ΔN decreases while making the throttle opening degree TH larger and making the pressure in the intake manifold (an intake manifold pressure Pin) higher than at the time of COM startup control. Incidentally, the surge pressure Ps is used as the intake manifold pressure Pin in the embodiment.

In fuel injection control at the time of self-supporting COM startup control in FIG. 3, the engine ECU 24 first receives data on the 30° rotation required time T30, a closure intake manifold pressure Pinc, and the like (step S100). It should be noted herein that a value computed based on the crank angle θcr of the engine 22 from the crank position sensor 140 is input to the engine ECU 24 as the 30° rotation required time T30. The closure intake manifold pressure Pinc is the intake manifold pressure Pin at the time (timing) when the intake valve 128 for the target cylinder is closed. In the embodiment, the surge pressure Ps from the pressure sensor 125a at the time when the intake valve 128 for the target cylinder is closed is input to the engine ECU 24 as the closure intake manifold pressure Pinc.

Upon receiving the data in this manner, the engine ECU 24 sets a threshold T30ref based on the closure intake manifold pressure Pinc (step S110), and compares the 30° rotation required time T30 with the threshold T30ref (step S120). It should be noted herein that the threshold T30ref is a threshold used to determine whether or not there is an apprehension about the occurrence of pre-ignition in the target cylinder, and that a time of, for example, about 15 milliseconds to 20 milliseconds can be used as the threshold T30ref. At the time of self-supporting COM startup control, the intake manifold pressure Pin is raised as described above. Moreover, the amount of air in the target cylinder increases as the closure intake manifold pressure Pinc rises. Besides, the time of stay in the vicinity of a compression top dead center (the time during which the interior of the cylinder is highly compressed) lengthens as the 30° rotation required time T30 lengthens, namely, as the rotational speed of the crankshaft 23 falls. When the amount of air in the cylinder is large and the time of stay in the vicinity of the compression top dead center is long, the temperature in the combustion chamber 129 tends to be high, and pre-ignition is likely to occur. In view of this, the processing of step S120 is designed to determine whether or not there is an apprehension about the occurrence of pre-ignition.

Figure 4:
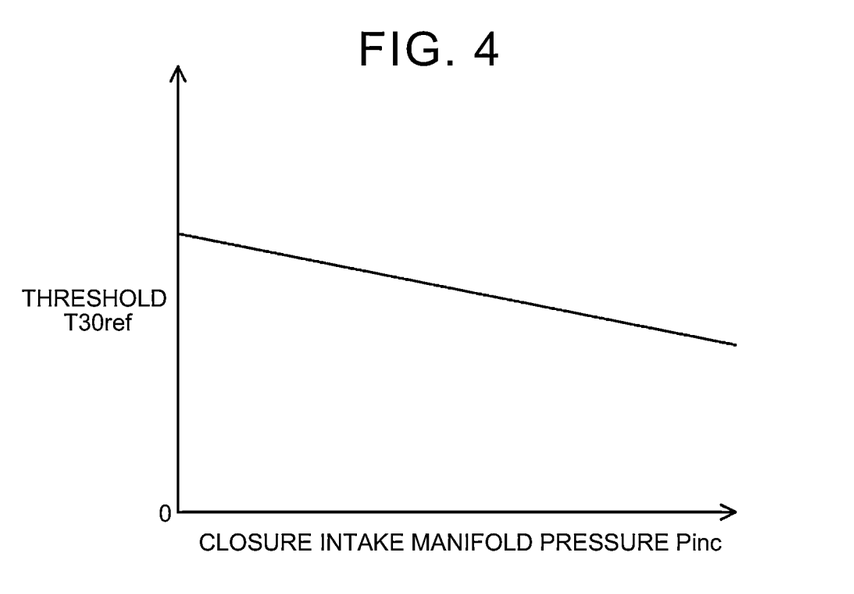
FIG. 4 is an illustrative view showing an example of a threshold setting map.

The threshold T30ref can be set as follows. That is, for example, a relationship between the closure intake manifold pressure Pinc and the threshold T30ref is determined in advance through an experiment, an analysis, mechanical learning or the like, and is stored as a threshold setting map. When the closure intake manifold pressure Pinc is given, the corresponding threshold T30ref is derived from this map. FIG. 4 is an illustrative view showing an example of the threshold setting map. As shown in this drawing, the threshold T30ref is set in such a manner as to shorten as the closure intake manifold pressure Pinc rises. This is because the likelihood of the occurrence of pre-ignition in the target cylinder increases as the closure intake manifold pressure Pinc rises (as the amount of air in the target cylinder increases).

If the 30° rotation required time T30 is shorter than the threshold T30ref in step S120, the engine ECU 24 determines that there is no apprehension about the occurrence of pre-ignition in the target cylinder, sets a first amount Qf1 as a target fuel injection amount Qf* of the target cylinder (step S130), and sets a first timing Tf1 as a fuel injection timing Tf of the target cylinder (step S140). It should be noted herein that the first amount Qf1 and the first timing Tf1 may be set uniquely or based on at least one of the rotational speed Ne of the engine 22, the closure intake manifold pressure Pinc, and the like. Fuel injection is then carried out from the in-cylinder injection valve 127 using the target fuel injection amount Qf* and the fuel injection timing Tf of the target cylinder (step S170) to end the present routine.

If the 30° rotation required time T30 is equal to or longer than the threshold T30ref in step S120, the engine ECU 24 determines that there is an apprehension about the occurrence of pre-ignition in the target cylinder, sets a second amount Qf2 larger than the first amount Qf1 as the target fuel injection amount Qf* of the target cylinder (step S150), and sets a second timing Tf2 later than the first timing Tf1 as the fuel injection timing Tf of the target cylinder (step S160). It should be noted herein that the second amount Qf2 and the second timing Tf2 may be set uniquely or based on at least one of the rotational speed Ne of the engine 22, the closure intake manifold pressure Pinc, and the like. Fuel injection is then carried out from the in-cylinder injection valve 127 using the target fuel injection amount Qf* and the fuel injection timing Tf of the target cylinder (step S170) to end the present routine. When the target fuel injection amount Qf* of the target cylinder is increased or the fuel injection timing Tf of the target cylinder is retarded, the amount of latent heat of vaporization of the fuel injected from the in-cylinder injection valve 127 increases, and the temperature in the combustion chamber 129 can be restrained from rising. Therefore, the occurrence of pre-ignition in the target cylinder can be suppressed.

Incidentally, at the time of FC recovery control, the rotational speed Ne of the engine 22 is higher, namely, the 30° rotation required time T30 is shorter than at the time of self-supporting COM startup control, so it is considered that there is not much apprehension about the occurrence of pre-ignition. Besides, at the time of COM startup control, the clutch K0 is half-engaged and the engine 22 is cranked by the motor 30, and there is hence no need to make the intake manifold pressure Pin higher than at the time of self-supporting COM startup control. It is therefore considered that there is not much apprehension about the occurrence of pre-ignition.

In the engine device with which the hybrid electric vehicle 20 of the embodiment described above is mounted, at the time of self-supporting COM startup control, the target fuel injection amount Qf* of the target cylinder is made larger and the fuel injection timing Tf of the target cylinder is made later when the 30° rotation required time T30 is equal to or longer than the threshold T30ref than when the 30° rotation required time T30 is shorter than the threshold T30ref. Thus, in the target cylinder, the amount of latent heat of vaporization of the fuel injected from the in-cylinder injection valve 127 increases, and the temperature in the combustion chamber 129 can be restrained from rising. Therefore, the occurrence of pre-ignition in the target cylinder can be suppressed.

Although not described in the embodiment, at the time of self-supporting COM startup control, fuel may be injected in the target fuel injection amount Qf* of the target cylinder from the in-cylinder injection valve 127 at a time or over a plurality of times when the 30° rotation required time T30 is shorter than the threshold T30ref, and fuel may be injected in the target fuel injection amount Qf* of the target cylinder from the in-cylinder injection valve 127 at a time when the 30° rotation required time T30 is equal to or longer than the threshold T30ref. Thus, the amount of latent heat of vaporization of the fuel injected from the in-cylinder injection valve 127 can be made larger than in the case where fuel is injected in the target fuel injection amount Qf* of the target cylinder from the in-cylinder injection valve 127 over a plurality of times when the 30° rotation required time T30 is equal to or longer than the threshold T30ref.

In the engine device with which the hybrid electric vehicle 20 of the embodiment is mounted, at the time of self-supporting COM startup control, the target fuel injection amount Qf* of the target cylinder is made larger and the fuel injection timing Tf of the target cylinder is made later when the 30° rotation required time T30 is equal to or longer than the threshold T30ref than when the 30° rotation required time T30 is shorter than the threshold T30ref. However, the fuel injection timing Tf of the target cylinder may be kept unchanged while the target fuel injection amount Qf* of the target cylinder is made larger, or the target fuel injection amount Qf* of the target cylinder may be kept unchanged while the fuel injection timing Tf of the target cylinder is made later.

In the engine device with which the hybrid electric vehicle 20 of the embodiment is mounted, at the time of self-supporting COM startup control, the threshold T30ref is set based on the closure intake manifold pressure Pinc. However, a certain time may be used as the threshold T30ref.

In the hybrid electric vehicle 20 of the embodiment, it is determined whether or not there is an apprehension about the occurrence of pre-ignition, through the use of the 30° rotation required time T30 that is a time required for rotation of the crankshaft 23 by the crank angle θca equal to 30°. However, the crank angle θca may be 10°, 20°, or the like instead of 30°.

The hybrid electric vehicle 20 of the embodiment is equipped with the automatic transmission 45 having six speeds. However, the hybrid electric vehicle 20 may be equipped with an automatic transmission having four speeds, five speeds, eight speeds, or the like.

The hybrid electric vehicle 20 of the embodiment is equipped with the engine ECU 24, the motor ECU 34, and the HVECU 70. However, at least two of these ECU's may be configured integrally.

The engine device of the embodiment is mounted in the hybrid electric vehicle 20. However, the engine device may be mounted in a mobile object other than a vehicle, or may be assembled into an immobile facility.

A corresponding relationship between the main elements of the embodiment and the main elements of the disclosure described in the section of means for solving the problem will be described. In the embodiment, the engine 22 corresponds to "the engine", the clutch K0 corresponds to "the clutch", the motor 30 corresponds to "the motor", and the HVECU 70, the engine ECU 24, and the motor ECU 34 correspond to "the control device".

Incidentally, the corresponding relationship between the main elements of the embodiment and the main elements of the disclosure described in the section of means for solving the problem does not limit the elements of the disclosure described in the section of means for solving the problem, since the embodiment is an example for concretely illustrating the mode for carrying out the disclosure described in the section of means for solving the problem. That is, the disclosure described in the section of means for solving the problem should be interpreted based on what is described in the section, and the embodiment is nothing more than a concrete example of the disclosure described in the section of means for solving the problem.

Although the mode for carrying out the disclosure has been described above through the use of the embodiment, it is obvious that the disclosure should not be limited at all to the embodiment, and that the disclosure can be carried out in various modes within such a range as not to depart from the gist of the disclosure.

The disclosure can be utilized in, for example, a manufacturing industry of engine devices.

What is claimed is:

1. An engine device comprising:
    an engine having an in-cylinder injection valve;
    a motor connected to an output shaft of the engine via a clutch; and
    a control device that controls the engine, the motor, and the clutch, wherein
    the control device at least either makes a fuel injection timing later or makes a fuel injection amount larger in a target cylinder to be subjected to explosive combustion subsequently, when a required rotation time that is a time required for rotation of the output shaft by a predetermined rotational angle is equal to or longer than a time threshold than when the required rotation time is shorter than the time threshold, at time of predetermined startup control in which the engine and the clutch are controlled such that fuel injection and ignition in the engine are resumed from a state where supply of fuel to the engine is cut off and the clutch is released and that the clutch is then engaged.

2. The engine device according to claim 1, wherein the time threshold is set in such a manner as to shorten as a closure intake manifold pressure that is a pressure in an intake manifold upon closure of an intake valve for the target cylinder rises.

3. The engine device according to claim 1, wherein the control device is configured to,
    in response to the required rotation time being shorter than the time threshold at the time of predetermined startup control, set a first timing as the fuel injection timing of the target cylinder, and
    in response to the required rotation time being equal to or longer than the time threshold at the time of predetermined startup control, set a second timing as the fuel injection timing of the target cylinder, wherein the second timing is later than the first timing.

4. The engine device according to claim 1, wherein the control device is configured to,
    in response to the required rotation time being shorter than the time threshold at the time of predetermined startup control, set a first amount as the fuel injection amount of the target cylinder, and
    in response to the required rotation time being equal to or longer than the time threshold at the time of predetermined startup control, set a second amount as the fuel injection amount of the target cylinder, wherein the second amount is larger than the first amount.

5. An engine device, comprising:
    an engine having an in-cylinder injection valve;
    a motor connected to an output shaft of the engine via a clutch; and
    a control device configured to control the engine, the motor, and the clutch, wherein
    at time of predetermined startup control, the control device is configured to control the engine and the clutch such that (i) fuel injection and ignition in the engine are resumed from a state where supply of fuel to the engine is cut off and the clutch is released, and (ii) the clutch is then engaged, and
    the control device is configured to, at the time of predetermined startup control,
        in response to a required rotation time, which is a time required for rotation of the output shaft by a predetermined rotational angle, being shorter than a time threshold, (a) set a first timing as a fuel injection timing of a target cylinder to be subjected to explosive combustion subsequently, or (b) set a first amount as a fuel injection amount of the target cylinder, and
        in response to the required rotation time being equal to or longer than the time threshold at the time of predetermined startup control, (a) set a second timing as the fuel injection timing of the target cylinder, wherein the second timing is later than the first timing, or (b) set a second amount as the fuel injection amount of the target cylinder, wherein the second amount is larger than the first amount.

* * * * *